Figure 2:
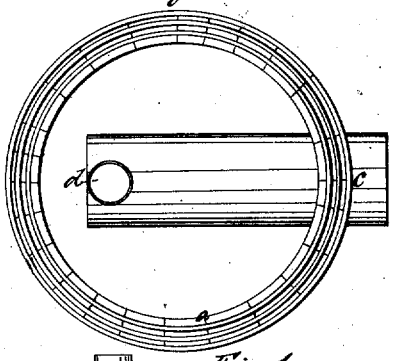
Figure 1:
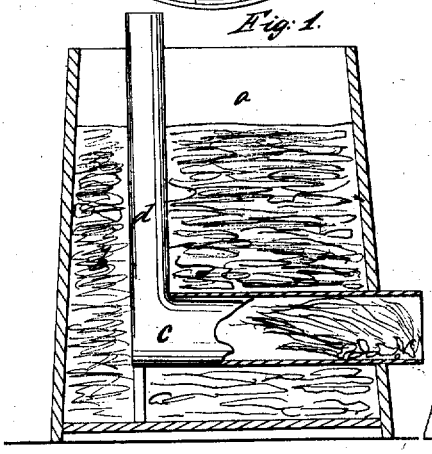
Figure 3:
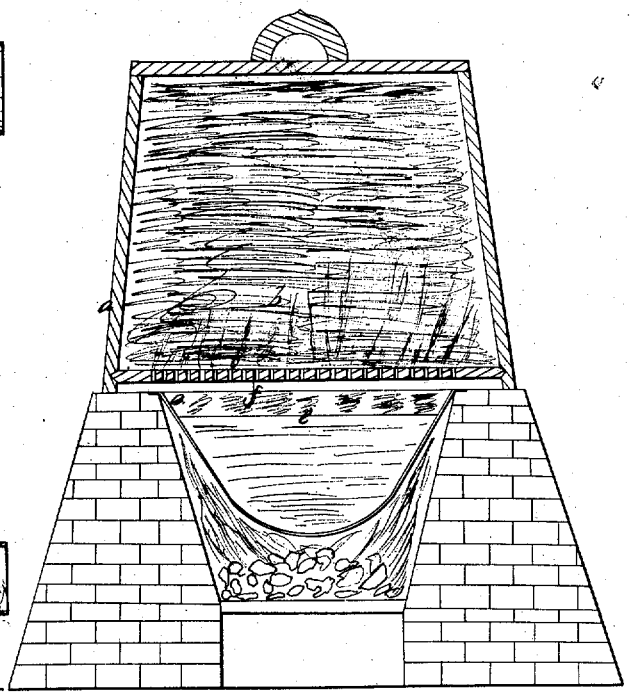

1856X

W. Edwards,

Tanning Apparatus,

Patented Dec. 30, 1812.

N. PETERS, PHOTO-LITHOGRAPHER, WASHINGTON, D. C.

1856X 171

William Edwards Letters Patent Dated Decr 30th 1810.

The Schedule referred to in these Letters Patent and making part of the same containing a description in the words of the said William Edwards himself of his improvement in Tanning Soal leather.

This Improvement consists in the application of heat to the tanning of soal leather this is done either by passing a cylinder through a vat filled with Bark and water so calculated as to receive wood or other fuel at one end of the cylinder which should be inserted into the vat: the other end of the cylinder forming a right angle should rise above the top of the vat to conduct the smoke from the fire. Heat may also be applied by steam by setting a wooden vat upon a boiler connecting them together, and in various other methods. the effect is to entirely extract the tanning principle from the bark in a short time and with this produce a strong decoction of the bark which applied to the hides warm when going upon the layers, shortens the process and produces a saving of bark and time in the process.

In presence of us
Daniel Stebbins
S. Stoddard Jr

Sign.d William Edwards

Received and Recorded anew April 8. 1843

Drawing and [illegible] 1848.